United States Patent
Rostocki et al.

(10) Patent No.: US 9,377,531 B2
(45) Date of Patent: Jun. 28, 2016

(54) ALTERNATIVE INSTALLATION OF A CONCEALED ULTRASONIC SENSOR IN THE MOTOR VEHICLE

(71) Applicant: VALEO Schalter und Sensoren GmbH, Bietigheim-Bissingen (DE)

(72) Inventors: Paul-David Rostocki, Bad Friedrichshall (DE); Frank Schwitters, Königslutter (DE)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 0 days.

(21) Appl. No.: 14/416,112

(22) PCT Filed: Jul. 23, 2013

(86) PCT No.: PCT/EP2013/065507
§ 371 (c)(1),
(2) Date: Jan. 21, 2015

(87) PCT Pub. No.: WO2014/016293
PCT Pub. Date: Jan. 30, 2014

(65) Prior Publication Data
US 2015/0177378 A1 Jun. 25, 2015

(30) Foreign Application Priority Data
Jul. 24, 2012 (DE) .......................... 10 2012 106 691

(51) Int. Cl.
*B60R 19/48* (2006.01)
*G01S 15/93* (2006.01)
(Continued)

(52) U.S. Cl.
CPC ............. *G01S 15/931* (2013.01); *B60R 19/483* (2013.01); *G01S 7/521* (2013.01); *G01S 7/54* (2013.01);
(Continued)

(58) Field of Classification Search
CPC ................. H01L 2924/00014; H01L 2924/00; H01L 2224/85205; H01L 2224/45124; G01S 15/88; G01S 15/931; G01S 2013/9314; G01S 2015/935; G01S 2015/938; G01S 13/931
USPC ........ 293/117; 180/169; 340/435, 436, 693.9, 340/903, 932.2; 367/93, 902, 96, 99; 73/597, 599; 701/301, 36, 41
See application file for complete search history.

(56) References Cited

U.S. PATENT DOCUMENTS 4,458,446 A * 7/1984 Mochida ................ B60K 28/00
49/28
4,803,670 A * 2/1989 Chen ....................... G01S 7/521
340/904

(Continued)

FOREIGN PATENT DOCUMENTS

DE          44 10 895 A1    10/1995
DE    10 2005 057 973 A1    6/2007

(Continued)

OTHER PUBLICATIONS

International Search Report for corresponding International Application No. PCT/EP2013/065507, mailed Oct. 18, 2013 (2 pages).

*Primary Examiner* — Kiran B Patel
(74) *Attorney, Agent, or Firm* — Osha Liang LLP

(57) ABSTRACT

The invention relates to an ultrasonic sensor arrangement (2) for a motor vehicle (1) with a cladding component (4, 5, 8, 9) and a first ultrasonic sensor (10 to 13), which with its membrane is disposed on a rear side of the cladding component (4, 5, 8, 9), so that the membrane is designed for transmitting and/or receiving ultrasonic signals through the cladding component (4, 5, 8, 9), wherein
the cladding component (4, 5, 8, 9) is a wing (4, 5, 8, 9) for the motor vehicle (1).

8 Claims, 1 Drawing Sheet

(51) Int. Cl.
*G01S 7/521* (2006.01)
*G01S 7/54* (2006.01)
*G01S 15/06* (2006.01)

(52) U.S. Cl.
CPC ........... *G01S 15/06* (2013.01); *G01S 2015/932* (2013.01); *G01S 2015/937* (2013.01); *G01S 2015/938* (2013.01)

(56) References Cited

U.S. PATENT DOCUMENTS

| | | | | |
|---|---|---|---|---|
| 4,845,682 A * | 7/1989 | Boozer | G01S 7/527 | 340/552 |
| 4,868,796 A * | 9/1989 | Ahrens | B65F 3/04 | 367/96 |
| 4,918,672 A * | 4/1990 | Iwabuchi | G01S 7/52004 | 367/188 |
| 4,920,520 A * | 4/1990 | Gobel | G01S 15/931 | 367/909 |
| 5,629,690 A * | 5/1997 | Knoll | B60R 19/483 | 340/435 |
| 5,701,122 A * | 12/1997 | Canedy | B60Q 9/007 | 340/435 |
| 6,100,796 A * | 8/2000 | Wagner | G01S 15/931 | 340/435 |
| 6,215,415 B1 * | 4/2001 | Schroder | G01S 13/931 | 250/349 |
| 6,433,679 B1 * | 8/2002 | Schmid | B60Q 9/007 | 340/435 |
| 6,437,688 B1 * | 8/2002 | Kobayashi | G08G 1/166 | 180/167 |
| 6,446,998 B1 * | 9/2002 | Koenig | B60D 1/30 | 180/169 |
| 6,611,202 B2 * | 8/2003 | Schofield | B60N 2/002 | 340/461 |
| 6,819,284 B2 * | 11/2004 | Maier | B60Q 9/006 | 340/932.2 |
| 6,879,914 B2 * | 4/2005 | Hoenes | B60Q 9/006 | 340/435 |
| 6,999,003 B2 * | 2/2006 | Matsukawa | B60W 10/06 | 340/435 |
| 7,054,729 B2 * | 5/2006 | Maier | G01S 13/931 | 340/932.2 |
| 7,084,745 B2 * | 8/2006 | Hartlieb | G01S 13/931 | 180/169 |
| 7,148,682 B2 * | 12/2006 | Becker | G01R 33/0094 | 324/207.2 |
| 7,227,474 B2 * | 6/2007 | Zoratti | G01S 13/18 | 340/435 |
| 7,232,001 B2 * | 6/2007 | Hakki | B60R 19/205 | 180/271 |
| 7,248,153 B2 * | 7/2007 | Danz | B60Q 9/007 | 340/435 |
| 7,311,107 B2 * | 12/2007 | Harel | A61B 1/00 | 128/899 |
| 7,403,101 B2 * | 7/2008 | Kropinski | B60Q 5/006 | 340/425.5 |
| 7,414,569 B2 * | 8/2008 | De Mersseman | G01S 13/42 | 342/118 |
| 7,492,282 B2 * | 2/2009 | Danz | B60Q 9/006 | 340/932.2 |
| 7,552,012 B2 * | 6/2009 | Lehner | G08G 1/167 | 340/435 |
| 7,554,484 B2 * | 6/2009 | Zimmermann | G01S 13/87 | 342/59 |
| 7,616,102 B2 * | 11/2009 | Kudelko | B60Q 1/22 | 340/435 |
| 7,620,518 B2 * | 11/2009 | Schmid | G01S 13/931 | 342/189 |
| 7,660,205 B2 * | 2/2010 | Barth | G01S 15/931 | 367/99 |
| 7,832,273 B2 * | 11/2010 | Schaaf | B60R 19/483 | 73/584 |
| 8,014,921 B2 * | 9/2011 | Rao | B60R 21/0134 | 280/735 |
| 8,031,556 B2 * | 10/2011 | Magane | G01S 15/931 | 367/99 |
| 8,064,285 B2 * | 11/2011 | Preissler | G01S 7/52004 | 367/13 |
| 8,077,024 B2 * | 12/2011 | Laufer | C07D 263/46 | 180/169 |
| 8,080,922 B2 * | 12/2011 | Reiche | G10K 9/122 | 310/323.21 |
| 8,081,539 B2 * | 12/2011 | Faber | G01S 7/52006 | 367/902 |
| 8,130,269 B2 * | 3/2012 | Mori | B60R 1/00 | 348/119 |
| 8,378,850 B2 * | 2/2013 | Toledo | B62D 15/027 | 340/435 |
| 8,446,289 B2 * | 5/2013 | Kido | B60K 35/00 | 340/815.4 |
| 8,482,433 B2 * | 7/2013 | Park | B60W 10/18 | 340/425.5 |
| 8,487,782 B2 * | 7/2013 | Pampus | B62D 15/027 | 340/435 |
| 8,671,762 B2 * | 3/2014 | Reiche | G10K 9/22 | 73/633 |
| 8,742,947 B2 * | 6/2014 | Nakazono | G08G 1/14 | 340/932.2 |
| 8,779,939 B2 * | 7/2014 | Barth | B62D 15/027 | 180/199 |
| 8,868,255 B2 * | 10/2014 | Yoshioka | B62D 1/00 | 340/435 |
| 8,880,344 B2 * | 11/2014 | Mathes | G01C 21/26 | 340/995.4 |
| 8,885,045 B2 * | 11/2014 | Yanagi | B60R 1/00 | 348/147 |
| 8,897,025 B2 * | 11/2014 | Urase | G10K 11/004 | 361/728 |
| 8,903,616 B2 * | 12/2014 | Fehse | G08G 1/168 | 340/518 |
| 8,942,065 B2 * | 1/2015 | Schmid | G01S 15/42 | 367/103 |
| 8,983,726 B2 * | 3/2015 | Lee | B62D 6/04 | 701/41 |
| 9,000,902 B2 * | 4/2015 | Eckel | G01S 7/524 | 340/435 |
| 9,007,196 B2 * | 4/2015 | Reed | E05F 15/43 | 180/286 |
| 9,026,310 B2 * | 5/2015 | Tran | B60G 17/0165 | 340/440 |
| 9,035,760 B2 * | 5/2015 | Reilhac | B60Q 9/004 | 180/271 |
| 9,140,791 B2 * | 9/2015 | Klotz | G01S 7/52004 | |
| 9,145,147 B1 * | 9/2015 | Lu | B60W 50/16 | |

FOREIGN PATENT DOCUMENTS

DE   10 2008 016 558 A1   10/2009
DE   10 2008 017 067 A1   10/2009

* cited by examiner

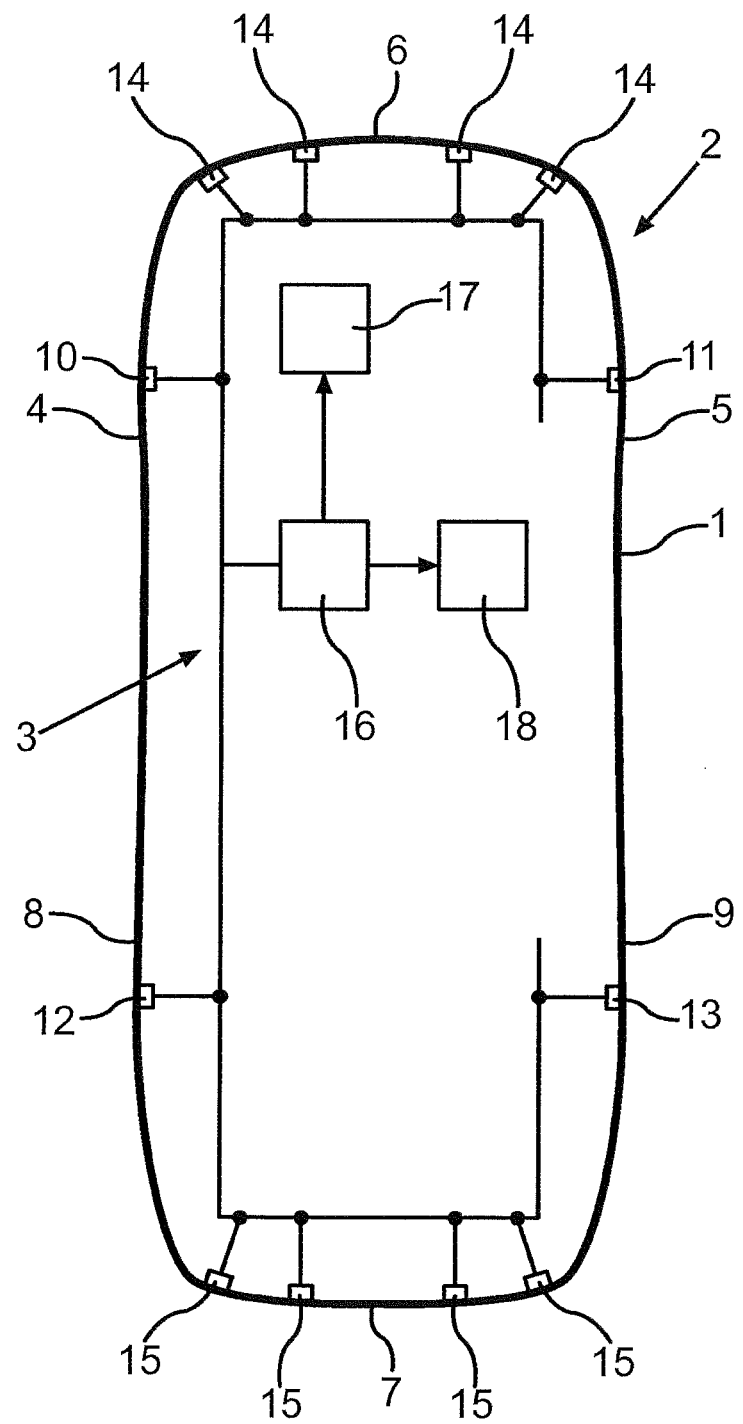

ALTERNATIVE INSTALLATION OF A CONCEALED ULTRASONIC SENSOR IN THE MOTOR VEHICLE

The invention relates to an ultrasonic sensor arrangement for a motor vehicle, with a cladding component and an ultrasonic sensor, which is disposed with its membrane on a rear side of the cladding component so that the membrane is designed for transmitting and/or receiving ultrasonic signals through the cladding component. Moreover, the invention relates to a motor vehicle with such an ultrasonic sensor arrangement.

Ultrasonic sensors are already prior art. They are usually used for a so-called parking aid of a motor vehicle, by means of which the driver of the motor vehicle is assisted when manoeuvring, i.e. especially when parking the motor vehicle in a parking space and when leaving the parking space. It is known to dispose a number of such ultrasonic sensors both on the front bumper and on the rear bumper for this. Using an ultrasonic sensor, distances between the motor vehicle on the one hand and the obstructions located in its surroundings on the other hand can be measured. An ultrasonic sensor transmits an ultrasonic signal during this that is reflected at an obstruction in the surroundings of the vehicle and subsequently passes back to the ultrasonic sensor, i.e. in the form of an echo. The distance can be determined by analysing the transition time of the transmitted signal.

It is already prior art that such ultrasonic sensors are installed in bumpers without being concealed. This means that they are disposed in recesses in the bumper and are externally visible. The bumper can be provided here with a plurality of such continuous recesses, in which the respective pot-shaped membranes of the ultrasonic sensors are inserted. The ultrasonic sensor itself is attached to the rear side of the bumper by means of a housing and using an additional retainer.

Moreover, ultrasonic sensors that are installed in a concealed or hidden manner are also known. These are thus not externally visible when the bumper is observed from the outside and are covered by the bumper itself. In the case of ultrasonic sensors installed directly behind the bumper in this way, the ultrasonic signals are transmitted or received through the material of the bumper. With such a configuration, the front surface of the pot-shaped membrane of the ultrasonic sensor is in contact with the rear of the bumper—possibly via a fitting cover.

At present, interest is directed at such a hidden or concealed arrangement of the ultrasonic sensor on the associated cladding component. However, it has been found that such an arrangement of the ultrasonic sensor can also be disadvantageous for the operation of an automatic parking aid system, by means of which a parking space is detected and then a suitable parking route is to be calculated, along which the motor vehicle can be parked in the parking space. And it is indeed necessary for the operation of an automatic parking aid system that such ultrasonic sensors are attached in lateral edge regions of the front bumper in order to be able to detect the parking spaces located laterally adjacent to the motor vehicle. However, with some vehicles the concealed installation of the ultrasonic sensor is not possible in said edge regions—i.e. effectively at the lateral edges of the vehicle, for example because of the design of the bumper. As strict requirements on the installation angle are connected with the installation of the ultrasonic sensor at this point, the ultrasonic sensor must be disposed at this point in a recess in the bumper, and thus so as to be visible. However, this would not be compatible with the aim of placing all ultrasonic sensors out of sight.

It is the object of the invention to provide an ultrasonic sensor arrangement of the above-mentioned type with which an improved placement of the ultrasonic sensor is provided—especially for the operation of an automatic parking aid system.

This object is achieved according to the invention by an ultrasonic sensor arrangement and by a motor vehicle with the features according to the respective independent claims. Advantageous embodiments of the invention are the subject matter of the dependent claims, the description and the FIGURE.

An ultrasonic sensor arrangement according to the invention for a motor vehicle comprises a cladding component and a (first) ultrasonic sensor, which is disposed with its membrane on the rear side of the cladding component facing the interior of the vehicle, so that the membrane transmits and/or receives ultrasonic signals through the cladding component. According to the invention, it is provided that the cladding component is a wing of the motor vehicle.

Thus the ultrasonic sensor is disposed out of sight or concealed on the rear side of the wing, so that the membrane of the ultrasonic sensor is designed for sending and/or receiving the ultrasonic signals through the material of the wing. The invention is based on the knowledge that in the prior art a concealed arrangement of the ultrasonic sensor for automatic parking aid systems is therefore not possible, because said ultrasonic sensor must be disposed in the edge region of the bumper and it is just at this point that the installation of the sensor is not always successful owing to the required installation angle. The invention now adopts the approach of attaching the ultrasonic sensor to a wing of the motor vehicle and indeed to the rear side of the wing, so that the ultrasonic sensor is disposed hidden behind the wing. The ultrasonic sensor can thus detect the lateral region adjacent to the motor vehicle and the detection of a parking space with a hidden ultrasonic sensor is also enabled, which constitutes the primary function of an automatic parking assistant.

Preferably, the cladding component, i.e. the wing, is made of plastic so that the membrane of the ultrasonic sensor is disposed on the rear side of the plastic material. Reliable propagation of the ultrasonic waves is enabled by this.

In one embodiment, the ultrasonic sensor arrangement further comprises a bumper for the motor vehicle and a second ultrasonic sensor, which is disposed with its membrane on the rear side of the bumper. The membrane of the second ultrasonic sensor transmits and/or receives the ultrasonic signals through the bumper. Using the plurality of ultrasonic sensors, the driver can also be supported particularly reliably when manoeuvring the motor vehicle by the measured distances to obstructions being displayed to the driver.

Preferably, the first and the second ultrasonic sensors are sensors of the same method of construction or identical sensors with the same resonant frequencies in the uninstalled state. The number of sensor types required is thus reduced to a minimum. Moreover, it can be enabled in this way that cross measurements are carried out between the two ultrasonic sensors, during which one ultrasonic sensor transmits ultrasonic signals and the other ultrasonic sensor receives the signals. Thus the exact position of an obstruction relative to the vehicle can be determined—for example using triangulation.

Preferably, a frequency of the ultrasonic signals transmitted by the first ultrasonic sensor is the same as a frequency of the ultrasonic signals transmitted by the second ultrasonic sensor. This means that the transmission and reception behaviour of the ultrasonic sensor installed behind the wing corresponds to the transmission and reception behaviour of the ultrasonic sensor installed behind the bumper. Thus, on the one hand, the above-mentioned cross measurements are enabled; on the other hand, analysis of the received ultrasonic signals of the two ultrasonic sensors is also possible without high computational costs.

In order to enable the same transmission and reception behaviour of the two ultrasonic sensors, it is preferably proposed that at least in the region of the first ultrasonic sensor the wing is designed such that the transmission frequencies of the two ultrasonic sensors are the same. For this purpose, the wing can be made of the same material as the bumper, at least in the region of the first ultrasonic sensor, namely especially of plastic. This has the advantage that the transmission and reception properties of the two ultrasonic sensors also remain the same at different temperatures, so that the transmission and reception behaviour of the first ultrasonic sensor corresponds to the transmission and reception behaviour of the second ultrasonic sensor regardless of the prevailing ambient temperature. I.e., if the vibration technological properties of the bumper change—for example because of a changed modulus of elasticity—then at the same time the vibration technological properties of the wing also change, as said wing is made of the same material.

It can also be provided that, at least in the region of the first ultrasonic sensor, the wing has the same thickness as the bumper in the region of the second ultrasonic sensor. The vibration technological properties of the wing in the region of the first ultrasonic sensor are thus also always the same as the properties of the bumper in the region of the second ultrasonic sensor. Said thickness can for example be 3 mm.

A motor vehicle according to the invention comprises an ultrasonic sensor arrangement according to the invention.

The preferred embodiments presented in relation to the ultrasonic sensor arrangement according to the invention and their advantages apply accordingly to the motor vehicle according to the invention.

Further features of the invention are revealed in the claims, the FIGURE and the description of the FIGURE. All features and combinations of features mentioned above in the description as well as the features and combinations of features mentioned below in the description of the FIGURE and/or shown in the FIGURE alone are not only able to be used in the respective specified combination, but also in other combinations or even on their own.

The invention will now be explained in detail using a preferred exemplary embodiment and also with reference to the accompanying FIGURE. For this the single FIGURE shows a motor vehicle according to an embodiment of the invention in a schematic representation.

A motor vehicle 1 represented in the FIGURE is a passenger vehicle in the exemplary embodiment. The motor vehicle 1 contains an ultrasonic sensor arrangement 2, which in the present case is a component of an automatic parking aid system 3. The parking aid system assists the driver when parking in a parking space. For this purpose, the parking aid system 3 can detect parking spaces and calculate a parking route, along which the motor vehicle 1 can be parked in the parking space. The guidance of the motor vehicle 1 into the parking space then takes place automatically or even semi-automatically. With automatic parking aid systems, the driver only needs to enable the automatic parking process and may also be able to interrupt it. The parking aid system 3 takes over both the longitudinal guidance and also the lateral guidance of the motor vehicle 1 in this case. With semi-automatic systems, by contrast, the driver needs to accelerate and brake, while the system for example takes over the lateral guidance.

The ultrasonic sensor arrangement 2 comprises a left and a right front wing 4, 5 as cladding components of the motor vehicle 1, and also a front and a rear bumper 6, 7 as further cladding components of the motor vehicle 1. Moreover, a rear left wing 8 and a rear right wing 9 as cladding components are also part of the ultrasonic sensor arrangement 2. Furthermore, the ultrasonic sensor arrangement 2 comprises a plurality of ultrasonic sensors, the number thereof in the exemplary embodiment being only exemplary and being illustrated by way of example. An ultrasonic sensor 10, 11, 12, 13 (first ultrasonic sensors) is disposed on each wing 4, 5, 8, 9 here, whereas four ultrasonic sensors 14 are disposed on the front bumper 6 and four ultrasonic sensors 15 (second ultrasonic sensors) are likewise disposed on the rear bumper 7.

The ultrasonic sensors may only be arranged behind the front wings 4, 5, and the rear wings 8, 9 can be free of such sensors or vice-versa.

All ultrasonic sensors 10 to 15 are disposed in this case on the rear side of the respective cladding component 4 to 9, so that the respective membrane is in contact with said rear side and the ultrasonic waves are transmitted through the material of the respective cladding component 4 to 9.

All ultrasonic sensors 10 to 15 are identical sensors or sensors of the same method of construction and also comprise the same resonant frequencies in the uninstalled state. Moreover, said cladding components 4 to 9, i.e. the bumpers 6, 7 and the wings 4, 5, 8, 9, are made of the same material, i.e. especially of plastic. Moreover, the cladding components 4 to 9 have the same thickness in the region of the sensors. Overall, all ultrasonic sensors 10 to 15 thus have the same transmission and reception properties or are operated with the same transmission frequency.

All ultrasonic sensors 10 to 15 are electrically coupled to a control device 16, which is a microcontroller for example. The control device 16 determines the distances to the obstructions using the reception signals of the ultrasonic sensors 10 to 15 and can especially also detect the parking spaces using the signals of the lateral ultrasonic sensors 10, 11, 12, 13. If a parking space is detected, then the control device 16 calculates a parking route or a trajectory, along which the motor vehicle 1 can be guided into the detected parking space. The parking process can then be carried out automatically with the output of suitable control signals to a drive and/or steering device 17.

The control device 16 can also output the measured distances using an output device 18. Said output device 18 is for example a loudspeaker and/or a display.

The invention claimed is:

1. An ultrasonic sensor arrangement for a motor vehicle, comprising:
   a cladding component; and
   a first ultrasonic sensor, which with a membrane of the sensor is disposed on a rear side of the cladding component so that the membrane is designed for transmitting and/or receiving ultrasonic signals through the cladding component,
   wherein the cladding component is a wing of the motor vehicle.

2. The ultrasonic sensor arrangement according to claim 1, wherein the wing is made of plastic.

3. The ultrasonic sensor arrangement according to claim 1, wherein the ultrasonic sensor arrangement further comprises a bumper for the motor vehicle and a second ultrasonic sensor, which is disposed with its membrane on a rear side of the bumper, so that the membrane of the second ultrasonic sensor transmits and/or receives ultrasonic signals through the bumper.

4. The ultrasonic sensor arrangement according to claim 3, wherein the first and the second ultrasonic sensors are sensors with a same method of construction with a same resonant frequencies in the uninstalled state.

5. The ultrasonic sensor arrangement according to claim 3, wherein a frequency of the ultrasonic signals transmitted by the first ultrasonic sensor is the same as a frequency of the ultrasonic signals transmitted by the second ultrasonic sensor.

6. The ultrasonic sensor arrangement according to claim 3, wherein the wing is made of a same material as the bumper, at least in a region of the first ultrasonic sensor.

7. The ultrasonic sensor arrangement according to claim 6, wherein at least in the region of the first ultrasonic sensor, the wing has a same thickness as the bumper in a region of the second ultrasonic sensor.

8. A motor vehicle with an ultrasonic sensor arrangement according to claim 1.

* * * * *